Oct. 29, 1957  F. A. HILL  2,811,686
VOLTAGE CONTROL SYSTEM
Filed June 1, 1954
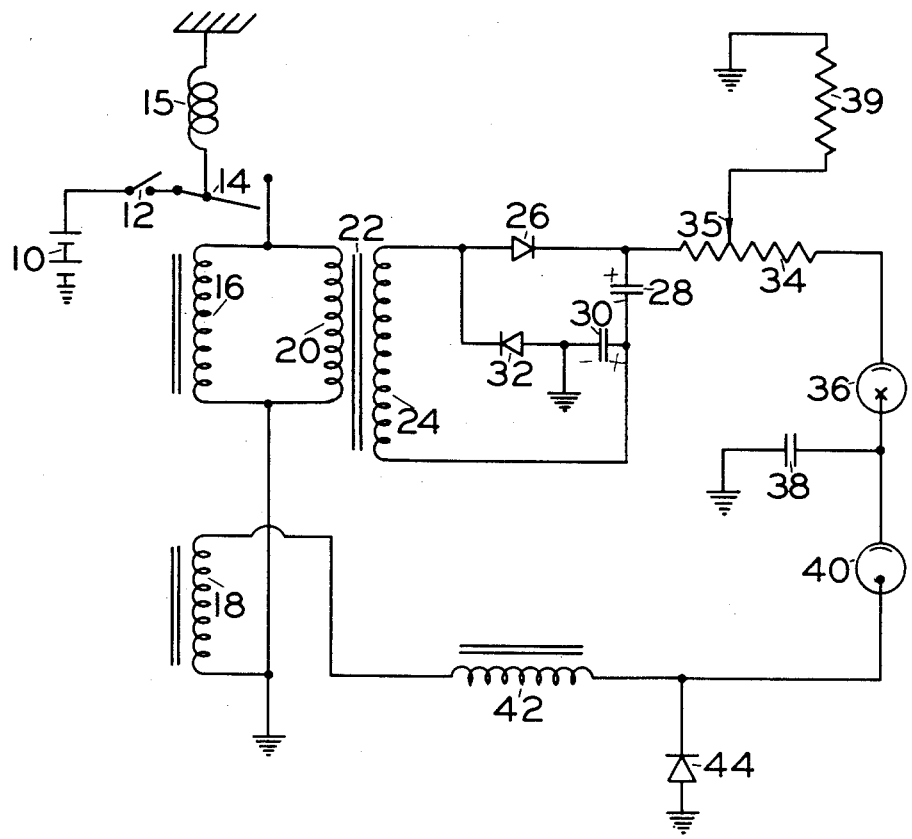
*INVENTOR.*
FRANK A. HILL
BY *Theodore H Lavagne*
ATTORNEY United States Patent Office 2,811,686
Patented Oct. 29, 1957

2,811,686
VOLTAGE CONTROL SYSTEM

Frank A. Hill, Van Nuys, Calif., assignor to Librascope, Incorporated, Glendale, Calif., a corporation of California Application June 1, 1954, Serial No. 433,570

13 Claims. (Cl. 321—2)

This invention relates to voltage control systems and more particularly to apparatus for producing a relatively high direct voltage of regulated value from a source of relatively low direct voltage. The invention is especially adapted to provide a control system which maintains a substantially constant output voltage even with considerable variations in input voltage and load current.

A relatively high direct voltage is sometimes required in apparatus which is to be readily portable and independent of any external power supply such as alternating voltage from a wall plug. Further requirements in such instances often are that the high voltage be produced in a minimum amount of space, that it be relatively stable at a particular value, that it employ economical low voltage batteries and that it dissipate as little power as possible.

One type of apparatus in which such a power supply may be required is a rate meter for measuring the intensity of radioactivity. Since the apparatus is to be self-sufficient and easily portable, a battery of the dry cell type is preferably used to supply power. The relatively low voltage from the battery must then be converted into a relatively high voltage of stable value so as to properly operate a geiger tube. Various attempts have been made to provide such a circuit but such attempts have not been entirely satisfactory.

This invention provides apparatus which receives a direct voltage from a battery, converts the direct voltage into an alternating voltage, amplifies the alternating voltage and then reconverts the amplified alternating voltage into a relatively large direct voltage. Conversion of the direct voltage to alternating voltage is accomplished by spring-loading a switch for closure and passing a current from the battery through the switch and through means magnetically coupled to the switch so as to open the switch and interrupt the current. This mechanism may be considered as a sensitive polarized relay.

The circuit also includes components for regulating the rectified direct voltage. Such components include a corona discharge voltage regulator and an inductance connected to a rectifier so as to pass a current from the rectifier through the inductance and the magnetic means for voltages greater than a particular value. Components are also included for sustaining the current through the inductance and the magnetic means for an extended period of time after the current from the rectifier has been interrupted. Since the magnetic means are energized by this current to adjust the opening and closing of the switch, the alternating voltage produced by the opening and closing of the switch becomes quickly adjused to yield the proper rectified voltage.

An object of this invention is to convert a relatively low direct voltage in the order of a few volts into a relatively high voltage in the order of several hundred or more volts.

Another object is to accurately regulate the rectified direct voltage which is produced so as to obtain a relatively large direct voltage of a particular value.

A further object is to produce a feedback signal for obtaining a very sensitive regulation of an output voltage.

Still another object is to utilize magnetic principles for obtaining a control signal for an extended period of time so as to produce an instantaneous and accurate regulation of an output voltage.

A still further object is to provide a regulation of an output voltage at a desired value regardless of considerable variations in input voltage and output current and with a minimum and substantially constant amount of power dissipation in the stabilizing action.

Another object is to provide apparatus of the above character which requires a minimum number of components and a minimum amount of space to obtain the desired direct voltage.

Other objects and advantages will be apparent from a detailed description of the invention and from the appended drawings and claims.

The single figure is a circuit diagram somewhat schematically illustrating one embodiment of the invention.

In the embodiment of the invention shown in the single figure, a suitable source of direct voltage such as dry cell batteries 10 are provided. When more than one cell is used, the cells may be arranged in series such that the negative terminal of a first cell is grounded and the positive terminal of a last cell is connected to the movable contact of a manually operated switch 12. The cells 10 are adapted to provide a direct potential of the order of a few volts.

The stationary contact of the switch 12 is connected to the movable contact of a relay 14. Preferably a relay is used in which the movable contact has a very low mechanical inertia, low friction losses, and is very sensitive, a D'Arsonval meter movement being well adapted for use as such a relay. The movable contact of the relay 14 is spring-loaded as at 15 for normal closure and is provided with windings 16 and 18. The winding 16 is connected between the stationary contact of the relay 14 and ground and is in parallel with the primary winding 20 of an iron-core transformer 22. The transformer 22 also has a secondary winding 24. The primary winding 20 of the transformer 22 may be formed from approximately 90 turns of No. 24 wire, and the secondary winding 24 may be formed from approximately 30,000 turns of No. 42 wire.

Connections are provided from one terminal of the secondary winding 24 to the plate of a diode 26 and from the other terminal of the winding 24 to the common terminal between a pair of capacitances 28 and 30. The capacitances 28 and 30 may have values of approximately 0.02 microfarad and voltage ratings of approximately 600 volts. The other terminal of the capacitance 28 is connected to the cathode of the diode 26, and the other terminal of the capacitance 30 is grounded. The plate of a diode 32 is also grounded and the cathode of the diode 32 has a common connection with the plate of the diode 26. The diodes 26 and 32 may be of selenium rectifiers such as U50HP rectifiers manufactured by the International Rectifier Corporation.

A potentiometer 34 having a movable contact 35, a voltage regulator tube 36 and a capacitance 38 are connected in series between the cathode of the diode 26 and ground. The winding of the potentiometer 34 may have a value such as 1 megohm; the voltage regulator tube 36 may be similar to that designated by the Victoreen Instrument Company as VR5950 and having a regulating potential of approximately 700 volts; and the capacitance 38 may have a value such as 800 microfarads and a voltage rating of approximately 300 volts. The output voltage from the circuit is taken from the movable contact 35 of the potentiometer 34 and is applied to one termined of an output load 39 having its other terminal grounded.

One terminal of a neon tube 40 such as that designated by the General Electric Company as NE-2 is connected to the common terminal between the voltage regulator tube 36 and the capacitance 38. The neon tube 40 may be considered as one type of "control means" as the term is used in the claims. An inductance 42 and the winding 18 are in series between the other terminal of the neon tube 40 and ground. The inductance 42 may be formed by winding approximately 27,000 turns of No. 34 wire on a toroidal mumetal core or a toroidal Permalloy No. 5515 core made by Arnold Engineering Company. The cathode of a diode 44 is connected to the common terminal between the neon tube 40 and the inductance 42, and the plate of the diode 44 is grounded. The diode 44 may be similar to that designated as IN-93 by the General Electric Company.

Since the relay 14 is normally closed by the spring 15, current flows through a circuit including the batteries 10, the switch 12, the relay 14 and the winding 16 when the switch 12 is manually closed. This current produces a sufficient magnetic flux in the winding 16 for the core of the winding to exert a greater downward force upon the movable contact of the relay 14 than the upward force exerted by the spring 15. As a result of this force, the relay 14 opens and interrupts the current through the winding 16. Upon the interruption of the current flow, the force exerted on the movable contact of the relay 14 by the spring 15 becomes predominant and the relay contacts again close. In this way, the contacts of the relay 14 alternately open and close to produce an interrupted current through the relay contacts and the winding 16.

Because of the connection of the primary winding 20 across the winding 16, an interrupted current also flows through the winding 20. (It should be noted that the inductance exhibited by the winding 20 gives a quick reversal of voltage on the polarized relay coil 16 when current is interrupted so as to hasten the closing of the contacts.) This interrupted current causes an alternating voltage to be produced in the primary winding 20 and magnetic flux to be produced for inducing an alternating voltage in the secondary winding 24. The voltage induced in the secondary winding 24 is in the order of several hundred volts because of the large ratio between the number of turns in the secondary winding 24 and the primary winding 20.

When the voltage induced in the winding 24 has a positive polarity at the upper terminal of the winding relative to the voltage at the lower terminal of the winding, current flows through a circuit including the winding, the diode 26 and the capacitance 28. This current charges the capacitance 28 to a relatively high value such that a positive charge is produced at the upper terminal of the capacitance in Figure 1 relative to the potential at the lower terminal of the capacitance.

Because of the considerable inductance in the transformer 22, a surge of voltage is induced in the transformer in an opposite direction to that produced by the flow of current through the winding 20 after the current has been initially produced by the closure of the relay 14. This surge of potential causes the potential at the lower terminals of the windings 20 and 24 to respectively become more positive than the voltages at the upper terminals of the windings.

Upon the induction of a more positive voltage at the lower terminal of the winding 24 than at the upper terminal of the winding current flows through a circuit including the winding, the capacitance 30 and the diode 32. The charging of the capacitance 30 is in a direction to produce a positive charge at the ungrounded terminal of the capacitance relative to the potential at the grounded terminal of the capacitance.

The charging of the capacitances 28 and 30 in the manner disclosed above produces a voltage doubler action by causing the voltage on the cathode of the diode 26 with respect to ground to be approximately twice as great as the voltage across either of the capacitances. Because of the rectifying action of the diodes 26 and 32 and the smoothing action of the capacitances 28 and 30, a substantially direct voltage is produced across the capacitances.

The voltage across the capacitances 28 and 30 produces a flow of current through a circuit including the capacitances, the winding of the potentiometer 34, the voltage regulator tube 36 and the capacitance 38. The current flowing through this circuit is very sensitive to voltage because of the action of the voltage regulator tube. This causes the voltage from the capacitances 28 and 30 to be smoothed even more into a substantially pure direct voltage. It also causes a preliminary stabilizing action to be provided in maintaining the output voltage at the top terminal of the voltage regulator tube 36 substantially constant.

The spring 15 is initially adjusted so that the relay 14 will be closed a considerable portion of each unit of time. The resultant flow of current through the primary winding 20 of the transformer 22 creates a tendency for the voltage produced across the capacitance 38 to be greater than that which is normally desired. When the voltage across the capacitance 38 is greater than the preferred value, it produces a breakdown of the neon tube 40 such that current flows intermittently through the tube. Upon the flow of current through the tube 40, the impedance presented by the tube changes from a very large value to a relatively low value.

The complete circuit for the flow of current from the capacitance 38 through the tube 40 includes the capacitance, the tube, the inductance 42 and the relay winding 18. When current flows through the winding 18, a magnetic flux is produced in the winding. Although the flux produced in the winding 18 is not strong enough to open the relay 14, it acts in opposition to the spring 15 so as to affect the effective spring characteristics acting on the relay. In this way, the current flowing through the winding 18 reduces the frequency at which the relay 14 opens and closes. As previously disclosed, the opening of the relay 14 is effectuated by the flow of current through the winding 16.

By reducing the frequency at which the relay 14 closes, the alternating voltage induced in the winding 24 becomes reduced. Since a reduced voltage is induced in the winding 24, the capacitances 28 and 30 do not receive charge at as great a rate as formerly. However, the capacitances 28 and 30 continue to discharge through the circuit including the potentiometer 34, the voltage regulator tube 36 and the capacitance 38 and through the circuit including the potentiometer 34 and the load 39 so that the voltage across the capacitances 28 and 30 decreases. In this way, the voltage at the output terminal 35 of the potentiometer 34 gradually decreases to the proper value.

The current flowing to the capacitance 38 becomes correspondingly reduced as the voltage across the capacitances 28 and 30 decreases. As the current to the capacitance 38 becomes reduced to the particular value desired (for example, 10 microamperes), the neon tube 40 becomes broken down to its low impedance at a reduced rate. The reduced rate at which the neon tube 40 becomes broken down causes current to flow less frequently than formerly from the capacitance 38 through the inductance 42 and the winding 18. This causes the relay 14 to close more frequently and for longer periods of time so that an increased alternating voltage is produced in the primary winding 20 and is induced in the secondary winding 24. The increased voltage induced in the secondary winding 24 produces a greater charging of the capacitances 28 and 30. In this way, the opening and closing of the relay 14 is regulated in frequency to maintain the proper output voltage at the movable contact 35 of the potentiometer 34.

During the time that a pulse of discharge current is flowing from the capacitance 38 through the neon tube 40 and the inductance 42, energy is building up in the inductance since inductances serve as energy storage devices. When the pulse of discharge current from the capacitance 38 stops, the energy in the inductance 42 is slowly released. The release of energy in the inductance 42 causes current to flow through a circuit including the inductance, the relay winding 18 and the diode 44.

The current flowing through the circuit including the inductance 42, the winding 18 and the diode 44 continues to flow until all of the energy stored in the inductance has been consumed as power losses in the circuit. These power losses occur in the resistive components of the inductance 42, the winding 18 and the diode 44. Since the resistive components of these members are relatively low, current flows through the circuit including these components for a relatively long time before the energy stored in the inductance is finally consumed.

The current flowing through the circuit including the inductance 42, the relay winding 18 and the diode 44 is somewhat greater than the current flowing from the capacitance 38 since the circuit has a relatively low impedance. Although the current flowing through the winding 18 during the release of energy from the inductance 42 is somewhat greater than the current flowing through the winding from the capacitance 38, it is still in the order of microamperes.

During the time that current flows through the circuit including the inductance 42, the winding 18 and the diode 44, the winding is energized to produce a magnetic flux which partially counteracts the force exerted on the relay 14 by the spring 15. A partial counteraction of the force exerted by the spring 15 on the relay 14 produces a reduction in the frequency of closure of the relay 14 and a corresponding reduction in the voltage induced in the secondary winding 14. The reduction in the frequency of closure of the relay 14 is greater during the release of energy from the inductance 42 than during the discharge of the capacitance 38 because of the increased current flowing through the relay winding 18. The reduction in the induced voltage resulting from the change in effective spring characteristics produces a tendency for the capacitances 28 and 30 to discharge to their proper value, as disclosed above.

It will be seen from the above disclosure that the inductance 42 facilitates the return of the output voltage to its proper value by extending the time during which the effective spring characteristics acting on the relay 14 are adjusted to reduce the frequency of relay response. The length of time during which the inductance 42 produces such action is dependent upon the energy which the inductance receives from the capacitance 38. The change in the effective spring characteristics during such period is also dependent upon the energy received by the inductance from the capacitance 38.

The energy received by the inductance 42 from the capacitance 38 is in turn dependent upon the frequency at which the neon tube breaks down to provide a low impedance. It is further dependent upon the amount of charge passing from the capacitance 38 during such periods of low impedance in the neon tube 40. These factors are relatively strictly dependent upon the average current flowing through the voltage regulator tube 36. In this way, the inductance 42 operates to reduce the operating frequency of the relay 14 for a particular period of time dependent upon the excess in the current flowing through the voltage regulator tube 36 above a desired value such as 10 microamperes.

The inductance 42 serves another important purpose. This results from the fact that it has a relatively small air gap compared to the winding 18. The relatively large air gap in the winding 18 occurs because of the requirement for the winding to actuate the movable contact of the relay 14 towards the winding when it becomes energized. Since the inductance 42 has a relatively small air gap, it requires only a relatively small number of turns to produce an inductive reactance of a particular value. This inductive reactance operates in conjunction with the diode 44 to produce a relatively large current through the winding 18 when the capacitance 38 supplies only a few microamperes. In this way, the inductance 42 serves to reduce the cost of components in the system.

It will be seen that variations in the output voltage above a desired value initially produce considerable increases in the current flowing through the voltage regulator tube 36 into the capacitance 38. This increase in current produces a flow of current through the relay winding 18 to reduce the frequency of closure of the relay 14 and the voltage induced in the secondary winding 24. This in turn produces a decrease in the voltage across the capacitances 38 and 40 and a corresponding reduction in the current through the voltage regulator tube 36. In this way, the current through the voltage regulator tube 36 is maintained substantially constant and the voltage regulation is actually produced by varying the input current flowing through the relay winding 14.

Since the current through the voltage regulator tube 36 is maintained substantially constant at a relatively low value, the power dissipation in the regulating circuit is relatively low. The power dissipation in the regulating circuit is also low because of the small currents flowing through the inductance 42 and the relay winding 18 and because of the low resistive values of these members. Furthermore, the substantially constant and small current through the regulatory components including the voltage regulator 36 causes the load 39 to operate independently of these components. The load operates independently even though large and variable currents flow through the load in relation to the current flowing through the regulatory components.

In this way, a very accurate type of voltage control system is obtained in which the output voltage is maintained substantially constant even with considerable variations in input voltage and load current. The system is also efficient because of the small and constant dissipation of power in the regulatory components in comparison to the power dissipated in the load.

The circuit disclosed above has several other important advantages in addition to those disclosed above. It converts a relatively low direct voltage in the order of a few volts into a relatively high direct voltage in the order of several hundred or more volts, and it simultaneously produces a regulatory action on the output voltage to stabilize it at a particular value. The circuit produces such a stabilized high voltage by controlling the frequency and closure time of a relay. The circuit also includes components which utilize magnetic principles to produce a feedback signal for increasing the sensitivity in the response of the relay. The circuit requires a minimum number of components to produce the stabilized output voltage. All of the components are relatively compact and light, and none of them has to be of the precision type.

I claim:

1. A voltage control system, including, a transformer, means for providing a direct voltage, means including relay means connected in a circuit with the voltage means and the transformer and responsive to a flow of current for producing an interrupted flow of current from the voltage means through the transformer for the creation of an amplified alternating voltage, means connected in a circuit with the relay means for rectifying the alternating voltage, an inductance associated with the relay means for controlling the operation of said relay means in accordance with the flow of current through the inductance, control means connected in a circuit with the rectifying means and the inductance to produce a flow of current through the inductance for controlling the operation of the relay means only during the existence of a rectified voltage greater than a particular value, and circuit means including the inductance and the relay means for producing a continued flow of current through the inductance for the operation of the flow-responsive means over an extended period of time after the interruption of current by the control means.

2. A voltage control system, including, a relay, means for providing a direct voltage, magnetic means connected in a circuit with the voltage means and the relay for acting upon the relay in a direction to open the relay upon a flow of current from the voltage means, means connected in a circuit with the relay to produce an amplified alternating voltage in accordance with the interrupted flow of current through the relay, means connected in a circuit with the amplifying means for rectifying the amplified alternating voltage, an inductance, circuit means including the inductance and the magnetic means for providing a flow of current through the inductance and the magnetic means to produce an opening action upon the relay only during the existence of rectified voltages greater than a particular value, and circuit means including the inductance and the magnetic means for providing a low impedance path for the continued flow of current through the inductance and the magnetic means upon the interruption of current from the rectifying means.

3. A voltage control system, including, means for providing a direct voltage, a relay spring-loaded for operation in one polarity, a first winding associated with the relay and operative upon being energized to actuate the relay into an alternate polarity, the winding being connected in a circuit with the voltage means and the relay to convert the direct voltage into an alternating voltage in accordance with the actuation of the relay between the first and alternate polarities, rectifying means for converting the alternating voltage into a direct voltage, a second winding magnetically coupled to the relay for adjusting the relative times of operation of the relay in its first and alternate polarities in accordance with the current flowing through it to produce an adjustment of the rectified voltage, unidirectional means, and an inductance connecting the rectifying means, the second winding and the unidirectional means to pass a current through the inductance and the second winding only upon the occurrence of voltages greater than a particular value from the rectifying means and in accordance with the value of such voltages.

4. A voltage control system, including, means for providing a direct voltage, a relay spring-loaded for normal closure, a first winding magnetically coupled to the relay to open the relay upon being energized, the relay and the winding being connected in a circuit with the voltage means for energizing the winding during the closure of the relay, means connected in a circuit with the winding for amplifying the alternating voltage resulting from successive openings and closures of the relay, rectifying means connected in a circuit with the amplifying means for converting the alternating voltage into a corresponding direct voltage, a second winding magnetically coupled to the relay to produce an opening action on the relay upon being energized, and circuit means having a low value of impedance and including an inductance and the second winding for producing a current through the second winding for an extended period of time only upon the occurrence of a voltage greater than a particular value from the rectifying means to regulate the voltage from the rectifying means.

5. A voltage control system, including, means for providing a direct voltage, a relay, magnetic means connected in a circuit with the voltage means and the relay to control the operation of the relay for the conversion of the direct voltage into an alternating voltage, means connected in a circuit with the relay for amplifying the alternating voltage, means connected in a circuit with the amplifying means for rectifying the amplified alternating voltage, control means connected in a circuit with the rectifying means for conducting current only during voltages greater than a particular value, inductive means connected in a circuit with the control means for receiving the current flowing through the control means for the storage of energy in the inductive means, the inductive means also being connected to the magnetic means to energize the magnetic means during the flow of current through the inductive means, and means connected in a circuit with the inductive means and the magnetic means for providing a low impedance path for the release of energy from the inductive means through the magnetic means upon the interruption of the current from the rectifying means to produce a continued flow of current through the magnetic means.

6. A voltage control system, including, an inductance, a winding connected in a circuit with the inductance, unidirectional means connected in the circuit with the inductance and the winding to provide a low impedance path through these members in a particular direction for the continuance of current flow through these members upon an initial passage of current into the members, a relay magnetically coupled to the winding for controlled operation in accordance with the current flowing through the winding, a second winding magnetically coupled to the relay for controlling the operation of the relay in accordance with the current flowing through the winding, means connected in a circuit with the second winding and the relay to provide a direct voltage for producing an interrupted flow of current through the relay, means connected in a circuit with the relay for converting the interrupted flow of current into an alternating voltage and for changing the amplitude of the alternating voltage, means connected in a circuit with the converting means for rectifying the alternating voltage, and circuit means including the rectifying means and the inductance for producing an initial flow of current through the inductance only during voltages greater than a particular value from the rectifying means.

7. A voltage control system, including, means for providing a direct voltage, a relay spring-loaded for normal closure, a first winding connected in a circuit with the voltage means and the relay to receive current upon the closure of the relay and magnetically coupled to the relay to produce an opening of the relay upon the flow of current, a transformer connected in a circuit with the relay to produce an amplified alternating voltage in accordance with the interrupted flow of current through the relay, means connected in a circuit with the amplifying means for rectifying the amplified alternating voltage, voltage-regulating means connected to the rectifying means to produce a flow of current in accordance with the rectified voltage, a capacitance connected in a circuit with the voltage-regulating means and the rectifying means to receive for charging the current flowing through the voltage-regulating means, control means connected to the capacitance for passing current only during voltages greater than a particular value across the capacitance, an inductance connected in a circuit with the control means and the capacitance for receiving the current flowing through the control means, a second winding connected in a circuit with the control means and the inductance to receive the current flowing through the inductance and magnetically coupled to the relay to adjust the opening and closing characteristics of the relay during the flow of current, and unidirectional means connected in a circuit with the inductance and the second winding to provide a low impedance path for a sustained flow of current through the inductance and the second winding upon the interruption of current through the control means.

8. A voltage control system, including, means for providing a direct voltage, a relay, means associated with the relay for providing the relay with certain characteristics of opening and closure, magnetic means connected in a circuit with the voltage means and the relay to receive current during the closure of the relay and to produce during current flow a magnetic flux for opening the relay, means connected in a circuit with the magnetic means for producing an alternating voltage in accordance with the opening and closing of the relay, means connected in a circuit with the last mentioned means for rectifying the alternating voltage, voltage regulating means connected in a circuit with the rectifying means for producing a flow of current in accordance with the voltage from the rectifying means, a capacitance connected in a circuit with the control means and the voltage-regulating means for receiving a charge in accordance with the current flowing through the voltage-regulating means, and second magnetic means connected in a circuit with the capacitance for producing a magnetic flux in accordance with the charge across the capacitance above a particular value to adjust the characteristics of the relay in a direction to reduce the alternating voltage produced.

9. A voltage control system, including, means for providing a direct voltage, a relay connected in a circuit with the voltage source and having a movable contact and a stationary contact, a spring operative upon the movable contact of the relay in a direction to produce a closure of the relay, first magnetic means connected in the circuit with the voltage means and the relay for receiving current from the voltage means during the closure of the relay and magnetically coupled to the relay for acting upon the relay during such periods of current flow to produce an opening of the relay, means connected in a circuit with the relay for producing an alternating voltage in accordance with the opening and closing of the relay, means connected in a circuit with the last mentioned means for rectifying the alternating voltage, control means connected in a circuit with the rectifying means to pass a current only for voltages greater than a particular value from the rectifying means, and second magnetic means connected in a circuit with the control means for receiving the current flowing through the control means and magnetically coupled to the relay for producing a force on the relay in a direction to reduce the effective spring characteristics acting on the relay for a corresponding reduction in the alternating voltage during the flow of current.

10. A voltage control system, including, means for providing a direct voltage, a relay connected in a circuit with the voltage means and having a movable contact and a stationary contact, a spring operative upon the movable contact of the relay in a direction to close the relay, means connected in the circuit with the relay and the voltage means to receive a flow of current and operative upon a flow of current to impose a force on the relay for opening the relay, means connected in a circuit with the relay and operative to produce an alternating voltage in accordance with the opening and closing of the relay, means connected in a circuit with the last mentioned means for rectifying the alternating voltage, means connected in a circuit with the rectifying means to pass a current only upon the occurrence of a rectified voltage greater than a particular value and dependent upon the excess in the rectified voltage above the particular value, and means connected in a circuit with the last mentioned means and operative in accordance with the flow of current through the last mentioned means to adjust the effective characteristics of the spring for a reduction in the frequency of the alternating voltage and a corresponding reduction in the rectified voltage.

11. A voltage control system, including, means for providing a direct voltage, a relay, means associated with the relay for providing the relay with certain characteristics of opening and closure, a winding connected in a circuit with the voltage means and the relay to receive a current during the closure of the relay and magnetically coupled to the relay to produce a magnetic flux for opening the relay, means connected in a circuit with the relay for producing an alternating voltage in accordance with the opening and closing of the relay, circuit means connected in a circuit with the last mentioned means and including a capacitance for rectifying the alternating voltage and for producing a charge across the capacitance, voltage regulating means connected in a circuit with the capacitance for producing a flow of current in accordance with the charge across the capacitance, a second capacitance connected in a circuit with the voltage regulating means to receive a charge in accordance with the current flowing through the voltage regulating means, and a second winding connected in a circuit with the second capacitance and magnetically coupled to the relay for producing a magnetic flux in accordance with the charge across the capacitance above a particular value to alter the characteristics of the relay in a direction to reduce the alternating voltage produced.

12. A voltage control system, including, means for providing a direct voltage, a relay, means for imparting to the relay certain characteristics for producing an opening and closing of the relay at a particular frequency, a first winding connected in a circuit with the voltage means and the relay to receive a flow of current during the closure of the relay and magnetically associated with the relay to produce an opening of the relay upon the flow of current, means connected in a circuit with the relay for producing an alternating voltage in accordance with the opening and closing of the relay, means connected in a circuit with the last mentioned means for rectifying the alternating voltage, a capacitance connected in a circuit with the rectifying means to receive a charge dependent upon the voltage from the rectifying means, control means connected in a circuit with the capacitance to provide a low impedance only during the existence across the capacitance of voltages greater than a particular value, and a second winding connected in the circuit with the control means and the capacitance to receive a current from the capacitance only during the periods of low impedance in the control means and magnetically associated with the relay to adjust the frequency characteristics of the relay in a direction to reduce the alternating voltage during the flow of current.

13. A voltage control system, including, means for providing a direct voltage, a relay spring-loaded for operation in one polarity and for returning the relay to the first polarity in a particular period of time upon its operation in a second polarity, a winding magnetically associated with the relay and operative upon being energized to actuate the relay into its second polarity, the winding being connected in a circuit with the voltage means and the relay to convert the direct voltage into an alternating voltage in accordance with the actuation of the relay between the first and second polarities, rectifying means for converting the alternating voltage into a direct voltage, a second winding magnetically associated with the relay for operating upon the relay in accordance with the flow of current to adjust the period of time required for the relay to return from its second polarity to its first polarity in a direction to reduce the alternating voltage, and control means connected in a circuit with the rectifying means and the second winding to initiate a flow of current through the second winding only during the existence of a rectified voltage greater than a particular value.

References Cited in the file of this patent

UNITED STATES PATENTS

| 2,078,316 | Dressel | Apr. 27, 1937 |
| 2,176,447 | Velkomesson | Oct. 17, 1939 |
| 2,439,107 | Slater | Apr. 6, 1948 |

FOREIGN PATENTS

| 871,338 | Germany | Mar. 23, 1953 |